UNITED STATES PATENT OFFICE 2,443,255

DERIVATIVES OF 2-AMINO-DIPHENYLSULFONE

Donovan E. Kvalnes, Penns Grove, N. J., assignor to E. I. du Pont de Nemours & Company, Wilmington, Del., a corporation of Delaware No Drawing. Application October 2, 1942, Serial No. 460,535

1 Claim. (Cl. 260—397.6)

This invention relates to new amino-diphenylsulfone derivatives, and especially to a class of 2-amino-diphenylsulfone derivatives. The new compounds are useful for various purposes, and especially as intermediates for azo dyes.

Heretofore various 2-nitro- and 2-amino-diphenylsulfone derivatives were known, such as those in which the nucleus substituted by amino is additionally substituted by amino, nitro or —N— acetyl, and those in which the phenylsulfone nucleus is substituted by sulfonic acid; but in so far as I am aware, no 2-amino-diphenylsulfone compounds were known wherein the phenylsulfonyl nucleus is substituted by an amine group comprising a —CO—Alkyl, —COO—Alkyl, —CO—Aryl, or —SO₂—Aryl group. The latter compounds are useful as diazo components for the manufacture of monazo wool dyes having unexpected dyeing and fastness properties.

It is among the objects of the present invention to provide 2-amino-diphenylsulfone derivatives which are represented in general by the formula

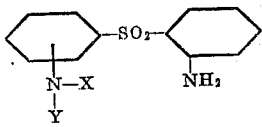

wherein —NXY is one of the group consisting of mono- and di-substituted amino groups in which X represents hydrogen, alkyl having 1 to 4 carbons or a substituted alkyl group as hereinafter defined, and Y represents —C—Alkyl
‖
O —C—Aryl of the benzene series, —C—methoxy —C—ethoxy
‖   ‖   ‖
O   O   O phenylsulfone, tolylsulfone and naphthylsulfone, wherein alkyl is from a group consisting of saturated and unsaturated aliphatic groups having 1 to 2 carbons and the mono-chloro, -phenyl, -phenoxy and -carboxy derivatives thereof and aryl is from a group consisting of phenyl, tolyl, mono-chloro phenyl, mono-sulfo phenyl and mono-carboxy phenyl. Other objects of the invention will be apparent from the following description.

The objects of the invention may be attained by heating a mixture of a benzene sulfinic acid which is substituted by the desired —NXY group and an ortho-nitro-chlorobenzene in the presence of an acid acceptor to form the 2-nitro derivative, and then reducing the nitro group. The objects may also be attained in general by reducing an ortho- or para-nitro-chlorobenzene with NaSH in aqueous solution made alkaline with sodium hydroxide until a compound is produced which is represented by the formula

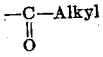

and then reacting with ortho-nitro-chlorobenzene to form the compound represented in general by the formula

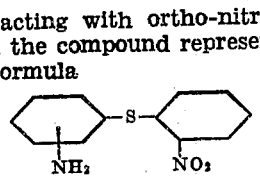

The latter compound is then reacted with an appropriate acid chloride or anhydride to form the desired substituted —NXY group, and then the resulting substituted diphenyl sulfide is oxidized to the corresponding diphenylsulfone by the action of hydrogen peroxide in glacial acetic acid medium. Finally the nitro group is reduced to amino. The alkylated sulfone amide group is formed by suitable alkylation of the sulfonamide group either directly before or directly after the oxidation to the diphenylsulfone. This second method is generally applicable only to the production of sulfones in which the amide substituent is in the ortho or para position in respect to the sulfone group.

The invention will be more fully set forth in the following more detailed description which includes examples that are given as illustrative embodiments of the invention and not as limitations thereof. Parts are expressed in parts by weight unless otherwise noted.

Example 1

Two hundred parts of p-acetylaminobenzene sulfinic acid, 158 parts of o-nitrochlorbenzene, 82 parts of sodium acetate (or 96 parts of potassium acetate) and 500 parts of methyl alcohol are placed in an enamel lined autoclave and the temperature gradually raised to 140°–150° C. The mixture is maintained at 140°–150° C. and stirred for eight hours. After cooling, the mixture is steam distilled to remove the alcohol and any unreacted o-nitrochlorbenzene, and then the mixture is made alkaline. The insoluble product is filtered off, dried and recrystallized from alcohol. The uncorrected melting point of the 2- nitro-4'-acetylamino-diphenylsulfone thus formed is 245°–247° C. Hydrogenation in alcohol with a nickel catalyst yields the amino compound

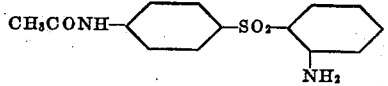

which has a melting point of 237°–239° C. following recrystallization from alcohol or acetic acid.

Instead of o-nitrochlorbenzene an equivalent amount of o-nitro-brombenzene can be used.

Instead of carrying out the reaction in an autoclave with methyl alcohol as the solvent, the same reaction may be effected by using a solvent such as cyclohexanol, the monomethyl ether of ethylene glycol and similar solvents and heating to the reflux temperature of the solution.

Example 2

2-amino-3'-acetylaminodiphenylsulfone is obtained by substituting an equal weight of m-acetylaminobenzene sulfinic acid for the para derivative used in Example 1.

Example 3

Five moles of 37% sodium hydrogen sulfide solution, five moles of 30% sodium hydroxide solution and 1000 cc. of water are heated to 95° C. Three hundred and fifteen grams of p-nitrochlorbenzene are added portionwise so as to avoid overheating the reaction mixture. After the final addition, the mixture is heated to refluxing temperature (about 102° C.) and refluxing is maintained for 1½ to 2 hours at which time only a trace of sulfide remains. The mixture is filtered and 315 g. of o-nitrochlorbenzene are added to the hot filtrate. This mixture then is refluxed for 16 hours and finally is subjected to steam distillation to eliminate any unchanged o-nitrochlorbenzene. The 2-nitro-4'-aminodiphenylsulfide thus formed is obtained by filtration subsequent to cooling. The melting point of the recrystallized yellow compound is 106° C.

One mole (246 g.) of 2-nitro-4'-aminodiphenylsulfide is suspended in 400 g. of glacial acetic acid and 110 g. of acetic anhydride are added. The mixture is refluxed for about four hours, cooled and drowned on ice and filtered. The dry product is recrystalized from acetic acid and has a melting point of 199°–200° C. Its formula is

One mole (286 g.) of this product is suspended in 800 g. of glacial acetic acid, heated to 100° C. and allowed to cool to 25° C. Five hundred cubic centimeters of 30% hydrogen peroxide are added and the mixture is allowed to stand at room temperature for two hours. The temperature is then slowly raised to 50° C. and maintained at this point for two hours. Then 200 cc. of 30% hydrogen peroxide are added and the temperature is gradually raised to 75° C. After maintaining the mixture for one hour at 75° C., 200 cc. more of 30% hydrogen peroxide are added, the temperature of the mixture is gradually raised to 90° C. and held there for one hour. The reaction mixture is cooled and the sulfone thus formed is filtered off. The filtrate is poured onto ice and water to obtain additional sulfone. This 2-nitro-4'-acetylaminodiphenylsulfone, recrystallized from glacial acetic acid, has a melting point of 245°–247° C. and is identical with that prepared by the method of Example 1. Upon catalytic reduction, it gives 2-amino-4'-acetylaminodiphenylsulfone which is identical with that described in Example 1.

Example 4

A mixture of 246 parts of 2-nitro-4'-aminodiphenylsulfide (prepared as described in Example 3), 225 parts of p-tolyl sulfon chloride, 150 parts of dimethyl aniline and 1000 parts of toluene are refluxed for 16 hours. The mixture is steam distilled to eliminate the solvent and excess dimethyl aniline. The mixture is filtered and the residue is washed with dilute acid. The residue is dissolved in dilute sodium hydroxide solution, filtered and the filtrate made acid by adding concentrated hydrochloric acid. The insoluble material is filtered off, washed and dried. The melting point of the 2-nitro-4'-p-tolyl sulfonylaminodiphenylsulfide thus formed is 168° C. This material is oxidized to give 2-nitro-4'-p-tolyl sulfonylaminodiphenylsulfone by the same procedure as that described in Example 3. Catalytic reduction gives 2-amino-4'-p-tolyl sulfonylaminodiphenylsulfone.

Example 5

A solution of 432 parts of 2-nitro-4'-p-tolyl sulfonylaminodiphenylsulfone (prepared as described in Example 4) in dilute sodium hydroxide solution is heated to 75° C. Then 126 parts of dimethyl sulfate are added gradually over two hours, during which time the reaction mixture is maintained alkaline by adding sodium hydroxide from time to time. After maintaining the mixture two to three hours at 75° C., an alkali insoluble material is formed and this is filtered from the hot solution. This material is recrystallized from alcohol giving 2-nitro-4'-(p-tolyl sulfonyl methyl amino) diphenylsulfone (M. P. 146° C.) which is represented by the formula

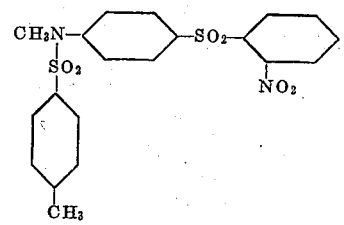

Catalytic reduction yields the corresponding 2-amino derivative (M. P. 169° C.).

Example 6

By using an equal weight of o-nitrochlorbenzene in place of the p-nitrochlorbenzene in the process of Example 3, 2-nitro-2'-aminodiphenylsulfide (M. P. 85° C.) is obtained. Acetylation as described in Example 3 gives 2-nitro-2'-acetylaminodiphenylsulfide (M. P. 135° C.). Oxidation with 30% hydrogen peroxide in glacial acetic acid yields 2-nitro-2'-acetylaminodiphenylsulfone (M. P. 182° C.), which on catalytic reduction gives 2-amino-2'-acetylaminodiphenylsulfone (M. P. 149° C.). The latter product is represented by the formula

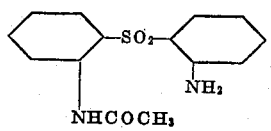

Example 7

The use of an equivalent amount of propionic anhydride instead of the acetic anhydride used in Example 3 yields 2-nitro-4'-propionyl aminodiphenylsulfide (M. P. 145° C.). Oxidation and reduction in the manner similar to that already described yields 2 - amino - 4' - propionylaminodiphenylsulfone which is represented by the formula

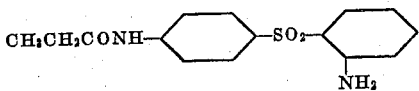

Example 8

Reaction of 2-nitro-4'-aminodiphenylsulfide in toluene with ethyl chlorocarbonate in a manner similar to that described in the foregoing examples produces 2-nitro-4'-carboethoxyaminodiphenylsulfide (M. P. 150°–151° C.). Oxidation with 30% hydrogen peroxide in glacial acetic acid produces the sulfone. Reduction of the nitro group by catalytic means produces 2-amino-4'-carboethoxyaminodiphenylsulfone which is represented by the formula

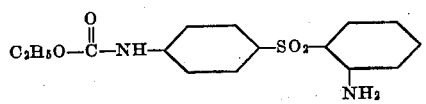

As illustrative of other products of the invention which are prepared by using the appropriate reactants in the manners described in the foregoing examples are mentioned:

Example
9  2-amino-4'-benzoylaminodiphenylsulfone,
10 2-amino-4'-p-chlorbenzoylaminodiphenyl - sulfone,
11 2-amino-4'-carbomethoxyaminodiphenyl - sulfone,
12 2 - amino - 4'- benzene sulfonylaminodi - phenylsulfone,
13 2 - amino-4'-p-tolyl sulfonylethylaminodiphenylsulfone,
14 2-amino-4'-p-tolyl sulfonyl hydroxy ethylaminodiphenylsulfone,
15 2 - amino - 4' - p - tolyl sulfonyl carboxy methylaminodiphenylsulfone,
16 2-amino-4'-p-tolyl sulfonyl beta-sulfoethylaminodiphenylsulfone,
17 2-amino-4'-benzene sulfonyl butylaminodiphenylsulfone,
18 2-amino-4'-benzene sulfonyl benzylaminodiphenylsulfone,
19 2 - amino - 4' - alphachlorpropionyl butylaminodiphenylsulfone,
20 2-amino-3'-phenyl acetyl methylaminodiphenylsulfone,
21 2-amino-4'-acetyl methylaminodiphenylsulfone,
22 2-amino-3' (acetyl butylamino) diphenylsulfone,
23 2-amino-4'-[m-sulfobenzoyl amino] diphenylsulfone,
24 2-amino-4' - chloracetylaminodiphenylsulfone,
25 2-amino-4'-phenoxyacetylaminodiphenyl - sulfone,
26 2 - amino - 4' - cinnamoylaminodiphenyl - sulfone,
27 2 - amino - 4' - succinoylaminodiphenyl - sulfone,
28 2-amino - 4' - phthaloylaminodiphenylsulfone,
28A 2-amino-4'-beta-naphthyl-sulfonylamino - diphenylsulfone,
29 2 - amino - 4' - beta - naphthoylaminodi - phenylsulfone,
29A 2 - amino - 3'-para-tolyl-sulfonylaminodiphenylsulfone,
30 2 - amino - 3' - chloracetylaminodiphenylsulfone,
31 2-amino-3'-benzoylaminodiphenylsulfone,
32 2 - amino - 2' - chloracetylaminodiphenyl - sulfone,
33 2-amino-2'-benzoylaminodiphenylsulfone,
34 2 - amino - 2' - benzene sulfonylaminodi - phenylsulfone,
35 2 - amino - 4'-para-tolyl-sulfonyl-sulfatoethylaminodiphenylsulfone,
36 2 - amino-4'-para-tolyl-sulfonyl-carboxyethylaminodiphenylsulfone,
37 2-amino-4' (carboethoxy ethylamino) diphenylsulfone,
38 2-amino-4' (benzoyl ethylamino) diphenylsulfone.

In the specification and claim, the term, substituted alkyl groups refers to methyl- or ethyl-monosubstituted by —OH, SO$_3$H, —OSO$_3$H, —COOH or —C$_6$H$_5$, such as —C$_2$H$_4$OH, —C$_2$H$_4$OSO$_3$H, —CH$_2$COOH, —C$_2$H$_4$SO$_3$H and —CH$_2$C$_6$H$_5$.

The described 2-aminodiphenylsulfone derivatives diazotized and coupled in acid medium with 2-amino-6-sulfo-8-naphthol, or its N-alkyl derivatives, yield dyes which on wool give red shades of good fastness to light and wet treatments. Depending on their structure, the dyes are eminently suited for dyeing wool under neutral conditions or under acid conditions.

This is a continuation-in-part of my copending application Serial No. 419,528, filed November 18, 1941, Patent No. 2,361,481, October 31, 1944.

From the foregoing disclosure it will be recognized that the invention is susceptible of modification without departing from the spirit and scope thereof and it is to be understood that the invention is not restricted to the specific illustrations thereof herein set forth.

I claim:
A compound represented by the formula

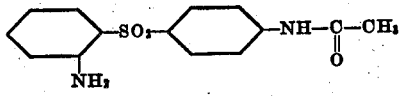

DONOVAN E. KVALNES.

REFERENCES CITED

The following references are of record in the file of this patent:

UNITED STATES PATENTS

| Number | Name | Date |
|---|---|---|
| 2,192,828 | Daniels | Mar. 5, 1940 |
| 2,224,156 | Kharasch et al. | Dec. 10, 1940 |
| 2,260,626 | Kleiderer et al. | Oct. 28, 1941 |

OTHER REFERENCES

Evans et al., "Jour. Chem. Soc." 1935, pages 181–188.

Buttle et al., "Biochem. Journ." (1938), vol. 32, pages 1101–1110.